(12) United States Patent
Tabellini (10) Patent No.: US 6,481,313 B1
(45) Date of Patent: Nov. 19, 2002

(54) PROTECTIVE COVER ATTACHABLE TO A WORKING PART WHICH IS MOBILE IN AT LEAST ONE PLANE

(75) Inventor: Giorgio Tabellini, Sasso Marconi (IT)

(73) Assignee: P.E.I. Protezioni Elaborazioni Industriali S.r.L., Bologna (IT)

( * ) Notice: Subject to any disclaimer, the term of this patent is extended or adjusted under 35 U.S.C. 154(b) by 22 days.

(21) Appl. No.: 09/677,498

(22) Filed: Oct. 2, 2000

(30) Foreign Application Priority Data

Jul. 10, 1999 (IT) .......................................... B099A0540

(51) Int. Cl.[7] ............................... E06B 3/42; F16P 3/00
(52) U.S. Cl. ........................ 74/612; 409/134; 162/202; 162/220; 162/222
(58) Field of Search ............................ 74/612; 160/202, 160/220, 223, 222; 408/241 G, 710; 409/134; 451/451, 452, 457; 108/20, 26, 90; 277/628, 630; 384/15

(56) References Cited

U.S. PATENT DOCUMENTS 5,482,414 A * 1/1996 Hayashi et al. ............. 409/134
5,560,415 A * 10/1996 Geissler ...................... 160/220
6,116,830 A * 9/2000 Azema ........................ 409/134

* cited by examiner

Primary Examiner—Chong H. Kim
Assistant Examiner—Justin Stefanon
(74) Attorney, Agent, or Firm—Fay, Sharpe, Fagan, Minnich & McKee, LLP (57) ABSTRACT

A protective cover for a zone of a machine tool, within whose area a working part of the machine moves along an operating path. The cover comprises a plurality of cover elements consisting of a fixed cover element which can be attached to the machine, a mobile element connected to the working part and a plurality of mobile cover elements positioned between the fixed cover element and the mobile cover element. The cover elements are arranged in order of decreasing size and lie around the working part, connected to one another by a first support and guide rod and a second support and guide rod, at a given distance from one another. Between the cover elements and the rods there is a plurality of sliders designed to guide the mobile cover elements in a direction parallel to and in a direction at right angles to the rods, during movement of the working part, keeping the working zone covered.

28 Claims, 6 Drawing Sheets

PROTECTIVE COVER ATTACHABLE TO A WORKING PART WHICH IS MOBILE IN AT LEAST ONE PLANE

BACKGROUND OF THE INVENTION

The present invention relates to a mobile protective cover for an open zone of a machine tool or similar type of machine, with working parts moving on the area defined by said zone.

The present cover is, in particular, attached to a working part or tool on the machine, which is mobile along an operating path, preferably extending in accordance with at least two reference coordinates and, in particular, extending in a plane that is substantially parallel to the plane in which the area lies.

Covers of this type are used mainly to stop dirt, shavings, chippings, machining emulsions and other extraneous matter from getting into the working area and preventing correct machine operation.

These protective covers basically comprise a plurality of cover elements consisting of substantially flat plates placed in contact with each another. One of the plates is rigidly fixed along the corresponding edges of the machine forming the above mentioned working area, and can act as a support for the other plates which slide relative to each other.

The perimetric dimensions of the fixed plate are such that it completely covers the open zone and has an opening which gives the plate the shape of a frame. The dimensions of the opening are substantially equal to the area in which the mobile tool is designed to move, defining the maximum travel possible for the tool along the two coordinates.

Starting with the fixed plate, the size of the other mobile plates gradually decreases down to the last and smallest plate in the set, which is attached to the mobile tool. The shape of each plate is similar to that of the others and each has a respective opening, giving it the shape of a frame similar to that of the fixed plate. The outer and inner perimetric dimensions of each frame-shaped plate are similar to the outer and inner perimetric dimensions of the larger and smaller plates adjacent to it.

Each plate is kinematically connected to the others and its size complements that of the plates adjacent to it in such a way that, following a movement of the tool along the above mentioned path, the plate attached to it drives the other plates along behind it, and these slide over one another, keeping the area of the above-mentioned zone closed and protected during the working movements of the tool. In this way, the cover protects the machining tool support and drive parts extending towards the inside of the machine.

The drive movements between the plates are transmitted by means of transmission mechanisms, such as chains and corresponding toothed wheels, or four-bar linkages, with extremely complex and difficult operation, especially if the tool moves at high speeds. Moreover, such types of mechanisms are costly, require long assembly times, and make the covers cumbersome and unwieldy.

Another disadvantage of known protective covers of this kind is that they are unable to support heavy weights resulting from the increasingly large machine tools and machining centers of the latest generation. Indeed, on account of their constructional characteristics and particularly complex mechanisms, these covers become useless when their size and weight exceed certain limits. The excessive weight of the mobile elements causes deformation and breakage of the transmission mechanisms, resulting in seizure and jamming of the mobile elements and creating dangerous situations.

The main aim of the present invention is to overcome the disadvantages of the protective covers made according to the teachings of prior art and to provide a protective cover of new design that can be attached to a mobile working part and that is economical and easy to construct while at the same guaranteeing trouble-free operation even if it is considerably large and heavy.

SUMMARY OF THE INVENTION

Accordingly, the invention as described in the claims below provides a protective cover for a machine zone with moving parts, where the machine comprises a frame and a working part which can move, relative to the frame, along an operating path. The protective cover comprises a plurality of cover elements, including at least one cover element which can be connected to the machine frame, a mobile cover element connected to the working part of the machine and, if necessary, one or more mobile intermediate cover elements, located between the fixed cover element and the mobile cover element. The cover elements have respective cover panels which extend substantially in a single plane, parallel to a defined placement plane, and each of which has a central opening in it. The cover elements are arranged in order of decreasing size, are positioned around the working part and are connected to the working part in such a way as to follow its movements, keeping the machining zone covered. Means are provided to support the mobile cover elements connected to the fixed cover element. The novel aspect of the protective cover made according to the present invention lies in that said support means comprise at least one first support rod and one second support rod, which are at a given distance from each other and which also constitute means for guiding the movement of the mobile elements in a first direction parallel to, and a second direction at right angles to, the rods themselves.

The use of such support and guide rods overcomes the disadvantages created by the insufficient rigidity of the protective covers known up to now and eliminates the need for complex transmission chains, toothed wheels and four-bar linkages, with appreciable advantages in terms of simpler construction and operation of the cover provided by the present invention, even if the cover is considerably large and heavy.

BRIEF DESCRIPTION OF THE DRAWINGS

Further characteristics and advantages of the invention are more clearly described in the detailed description which follows, with reference to the accompanying drawings, which illustrate preferred embodiments of the invention, without restricting the scope of the inventive concept, and in which.

DESCRIPTION OF THE PREFERRED EMBODIMENTS

With reference to the accompanying drawings, the present preferred embodiment of the protective cover 1 is designed to cover a zone of a machine 100 tool or similar machine having moving parts 101. The moving parts 101 (only schematically illustrated) support and move a working part 102 (also schematically illustrated) that can move along an operating path which preferably extends in a horizontal plane P, the moving machine parts 101 to be protected being located below said plane, inside the machine 100.

The cover 1 comprises a plurality of cover elements which, in the present preferred embodiment, consist of an end cover element 2a which is fixed to the machine 100 at the zone that necessitates adequate protective covering, a mobile end cover element 2e, connected to the working part 102 of the machine 100 and having a central opening 3e to allow the passage of the working part 102 itself; as well as a first, a second and a third intermediate cover element 2b, 2c, 2d, which can move and extend between the fixed end cover element 2a and the mobile end cover element 2e.

Starting from the fixed element 2a, the cover elements 2a, 2b, 2c, 2d, 2e are arranged in order of decreasing size and extend over the entire zone to be protected, being positioned around the working part 102. In fact, the cover elements 2a, 2b, 2c, 2d, 2e are connected to the working part 102 in such a way as to follow its operating movements, keeping the working zone covered, as is more clearly described below.

Figure 3:
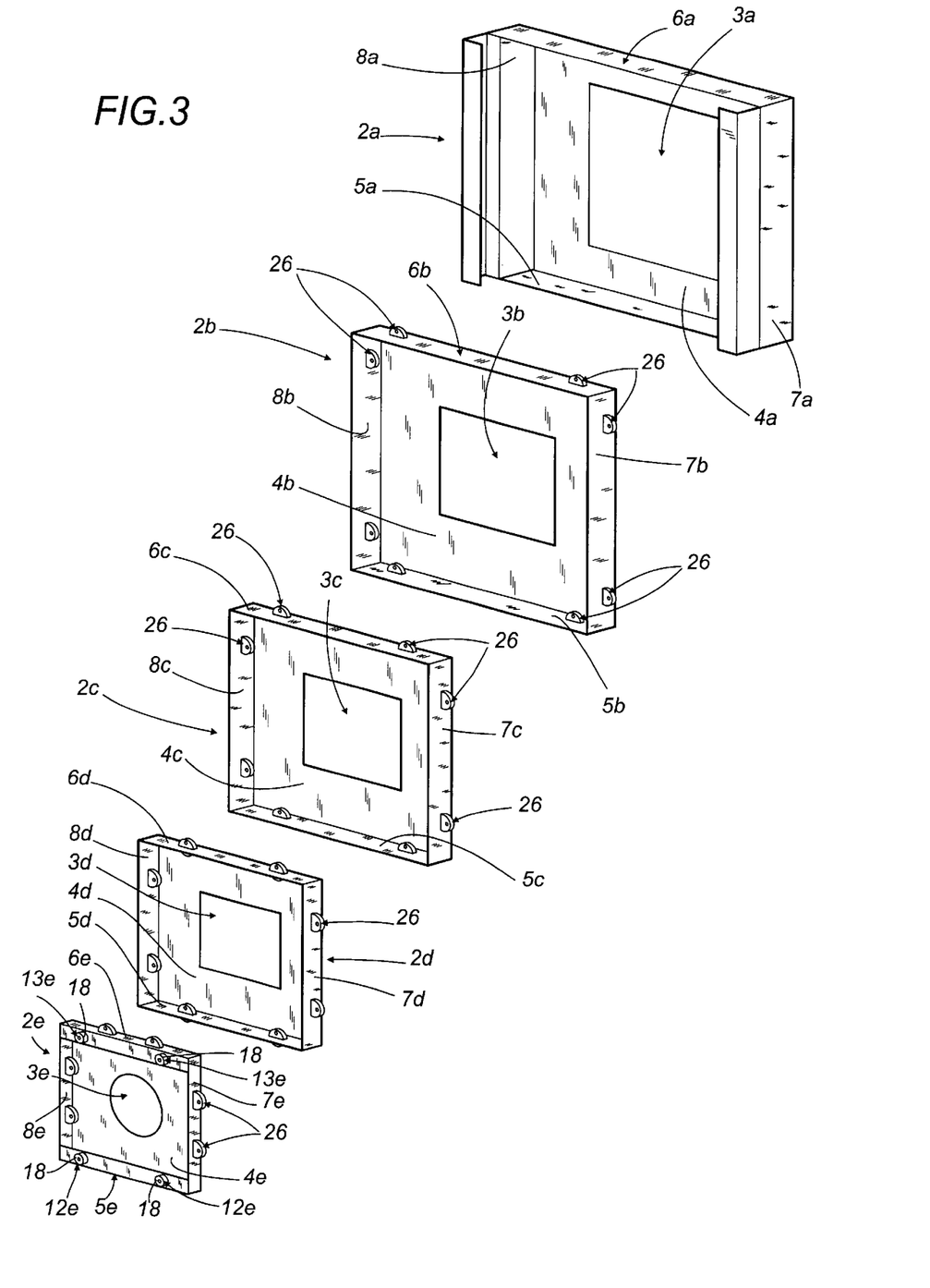
FIG. 3 is an exploded perspective view of only the cover elements forming part of the cover illustrated in FIGS. 1 and 2.
Figure 4:
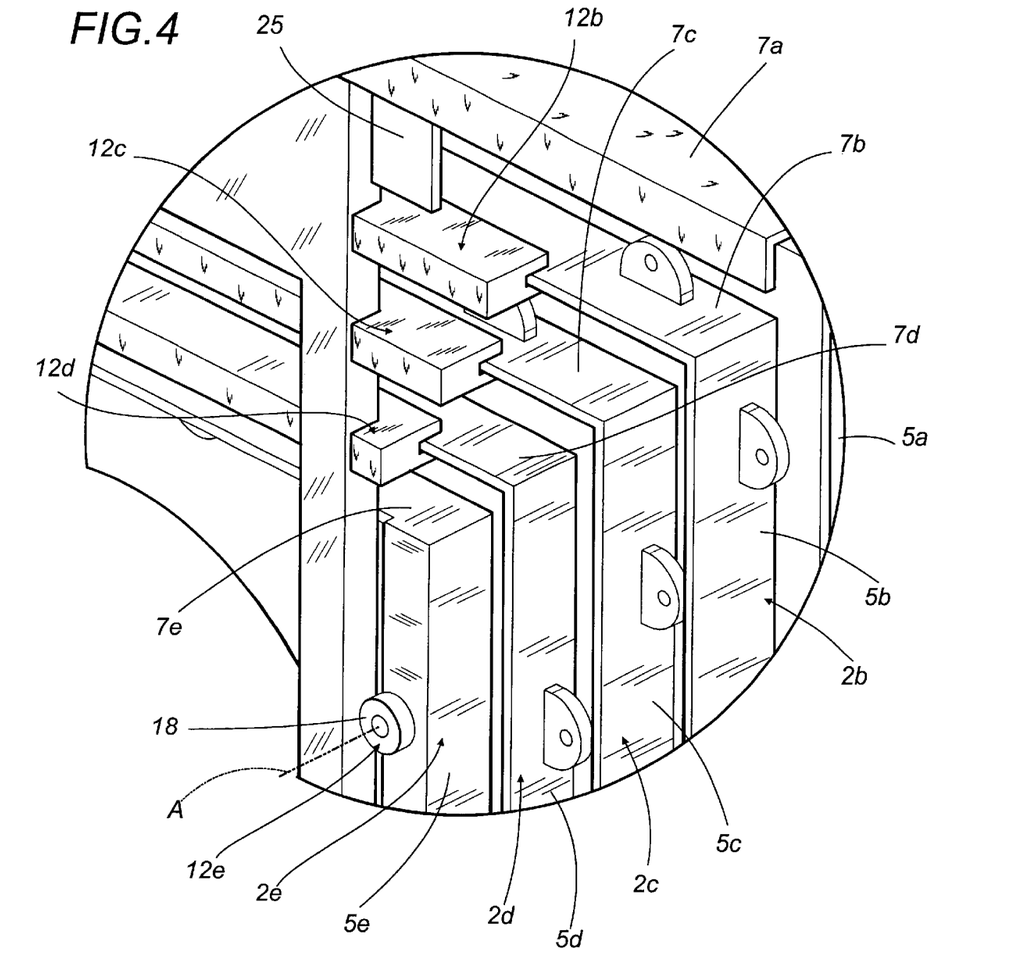
FIG. 4 is a perspective view of a detail from FIG. 1.

As clearly shown in FIG. 3, the cover elements 2a, 2b, 2c, 2d, 2e consist of flat cover panels or plates 4a, 4b, 4c, 4d, 4e, with corresponding openings 3a, 3b, 3c, 3d, 3e in them, which are substantially central and through which the moving part 101 of the machine 100 passes.

Figure 5:
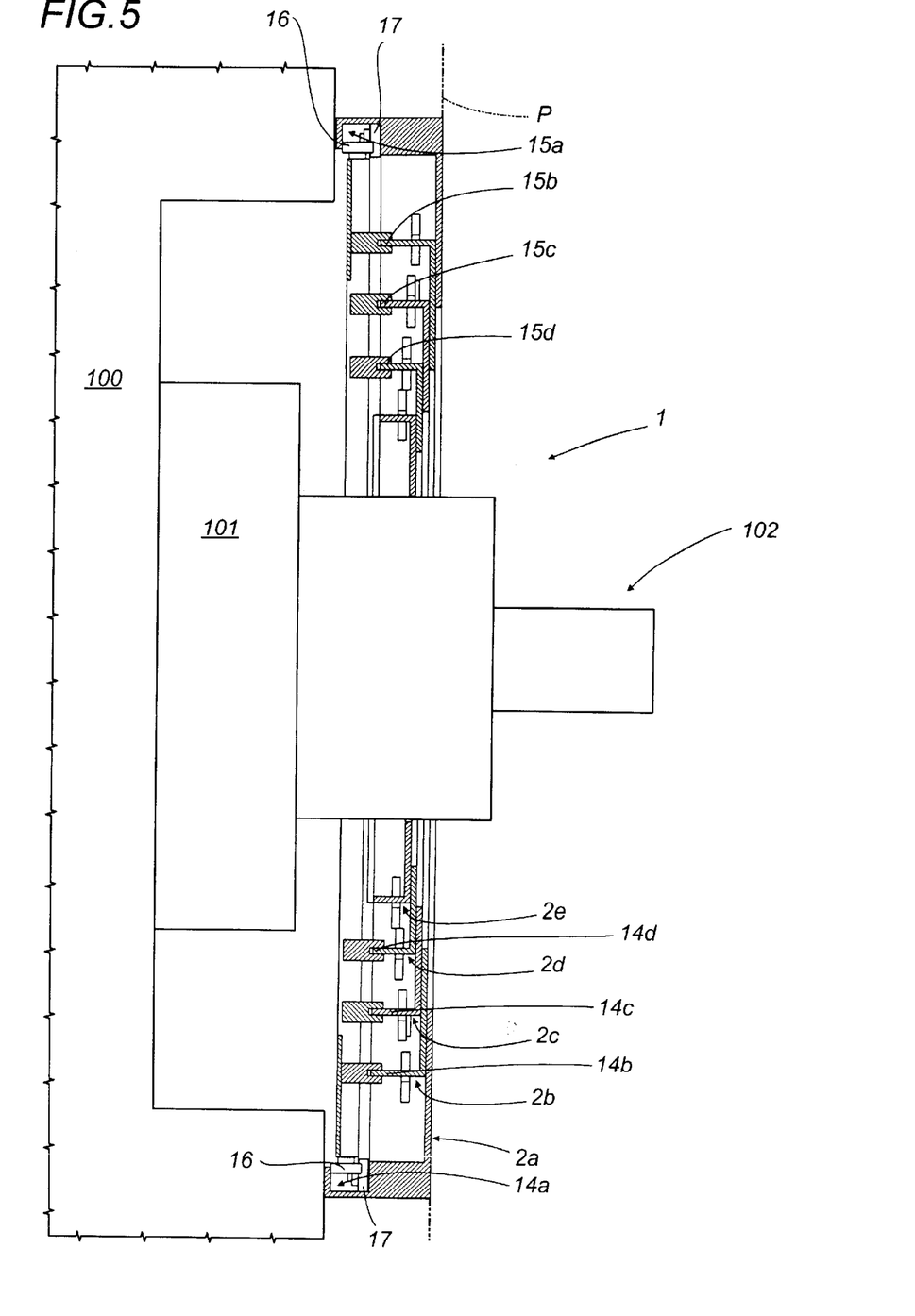
FIG. 5 is a scaled-up cross section of the cover illustrated in FIG. 2 along line V—V.

The cover panels 4a, 4b, 4c, 4d, 4e slide in contact with one another in such a way that they effectively seal off the machine zone to be protected (see FIG. 5). Moreover, the panels have an outer quadrangular perimetric edge from which there extend, perpendicular to the cover plane, corresponding longitudinal walls 5a, 6a, 5b, 6b, 5c, 6c, 5d, 6d, 5e, 6e located on opposite longitudinal sides of the cover element, and corresponding transversal walls 7a, 8a, 7b, 8b, 7c, 8c, 7d, 8d, 7e, 8e, located on corresponding opposite transversal sides of the cover element.

As illustrated in the figures, the mobile cover elements attached to the fixed cover element are supported by two support rods 9, 10. The rods are parallel and separated by a given distance, and constitute means for guiding the movement of the mobile cover elements 2b, 2c, 2d, 2e in a direction parallel to, and in a direction at right angles to, the rods 9, 10.

Figure 1:
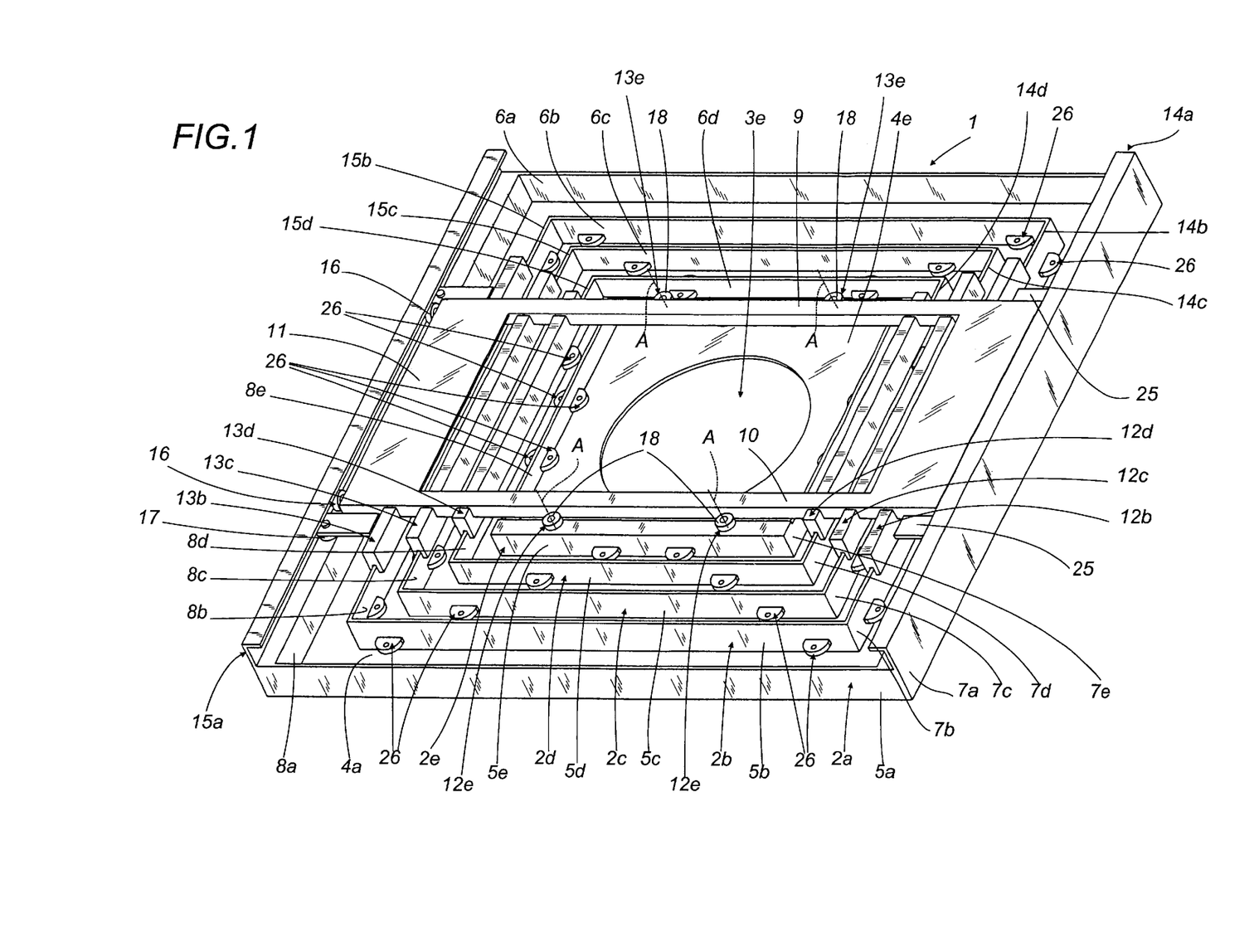
FIG. 1 is a perspective view from below of a preferred embodiment of the protective cover made according to the present invention.
Figure 2:
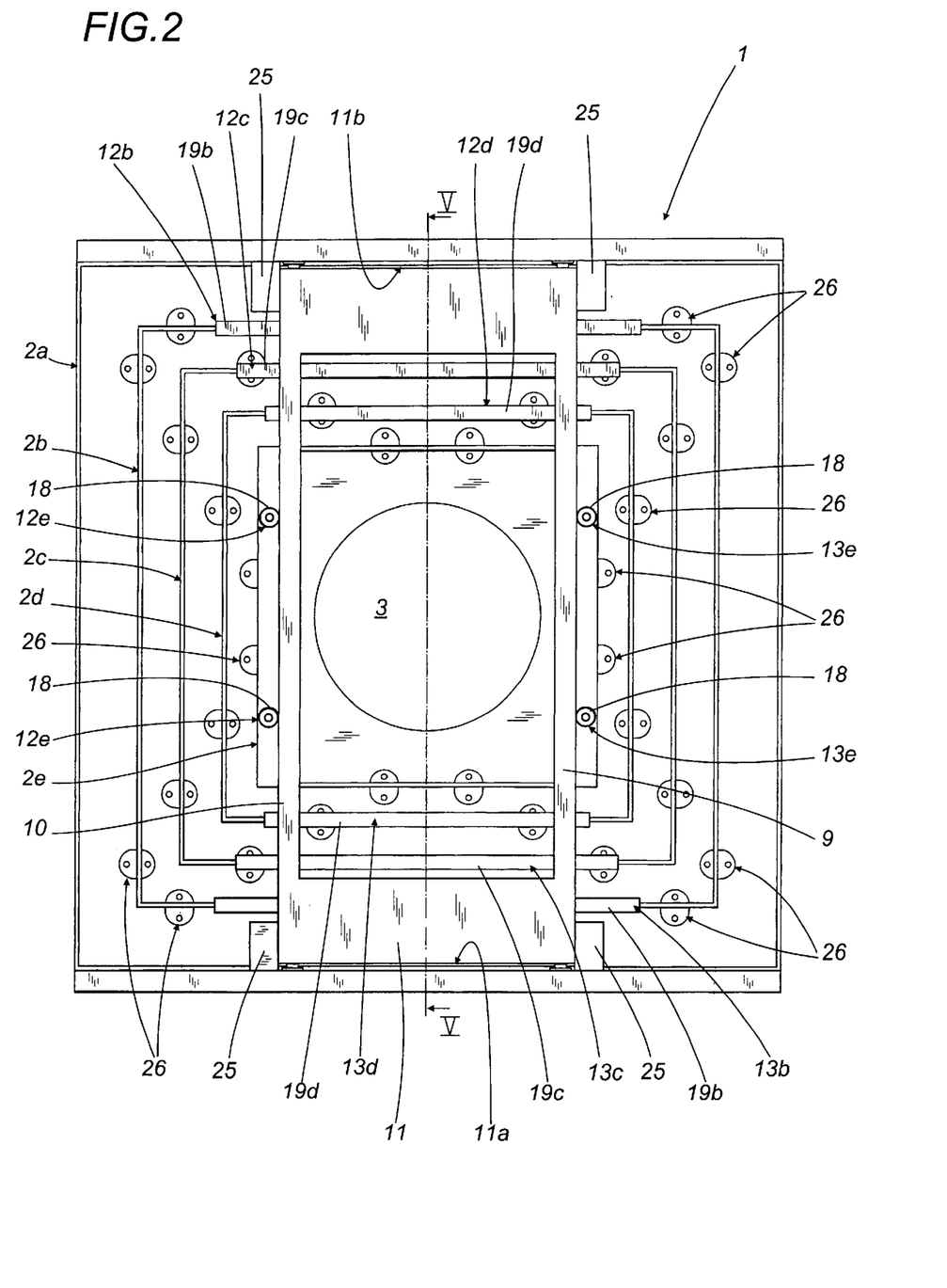
FIG. 2 is a front view from below of the cover illustrated in FIG. 1.

In the preferred embodiment illustrated, the rods 9, 10 are connected to each other to form a single supporting structure 11 with marked structural rigidity. Said structure 11 has an outer perimetric edge that is substantially rectangular in shape, having two longitudinal sides formed by the rods 9, 10 themselves, and two transversal sides 11a, 11b (see FIG. 2).

To guide the mobile cover elements 2b, 2c, 2d, 2e in a direction parallel to the support rods 9 and 10, there are envisaged, between each of the elements 2b, 2c, 2d, 2e and the rods 9 and 10 themselves, corresponding sliders 12b, 13b, 12c, 13c, 12d, 13d, 12e, 13e that slide freely on the rods to which they are associated. Longitudinal portions of the rods 9 and 10 therefore constitute guide rails for the sliders 12b, 13b, 12c, 13c, 12d, 13d, 12e, 13e.

In order to guide the cover elements 2b, 2c, 2d, 2e in a direction at right angles to the support rods 9 and 10, the fixed and intermediate cover elements 2a, 2b, 2c, 2d have corresponding opposite guide rails 14a, 15a, 14b, 15b, 14c, 15c, 14d, 15d which lie at right angles to the support rods 9 and 10 and on which the rods 9 and 10 themselves can slide.

To facilitate relative sliding contact between the rods 9, 10 and the guide rails 14a, 15a, 14b, 15b, 14c, 15c, 14d, 15d in the direction at right angles to the rods themselves, there are envisaged corresponding sliders, placed between the rods 9, 10 and the rails 14a, 15a, 14b, 15b, 14c, 15c, 14d, 15d and designed to slidably engage the longitudinal guide rails formed by the rods 9, 10 themselves.

The aforementioned structure 11 can move in a direction at right angles to the rods 9, 10. The sliding of the structure 11 itself relative to the fixed cover element 2a is accomplished through wheel-like sliders 16 and 17 fitted on the structure 11 close to the transversal sides 11a, 11b of its outer perimetric edge and engaging the rails 14a, 15a forming part of the fixed cover element 2a. The rails 14a, 15a are designed to oppose the force created by the weight of the mobile cover elements 2b, 2c, 2d, 2e on the structure 11 and transmitted from the latter to the fixed element 2a, and they therefore have a substantially C-shaped profile such as to support and at the same time guide the movement of the structure 11, preventing it from jamming. For this purpose, there are two wheel-like sliders 17 mounted, with their axes of rotation at right angles to the plane P (see FIG. 5), on each of the transversal edges 11a, 11b of the structure 11, and they are suitably spaced to more effectively guide the movement of the structure 11 itself and better oppose the forces that would otherwise cause the structure 11 to become deformed and jammed. The wheel-like sliders 16 rotate about axes that are substantially parallel to the rods 9, 10 and are designed to support the structure 11 during its movement at right angles to the rods 9, 10.

In the embodiment illustrated in the drawings, the sliders connected with the elements 2b, 2c, 2d during their movement in the direction at right angles to the rods 9, 10 are made as a single block with the aforementioned sliders 12b, 13b, 12c, 13c, 12d, 13d which slide along the rods 9, 10. The sliders of the intermediate cover elements 2b, 2c, 2d therefore constitute elements for sliding along the support rods 9, 10 and for sliding along the corresponding guide rails 14b, 15b, 14c, 15c, 14d, 15d at right angles to the support rods 9, 10.

The cover element 2e is forced to move in the direction at right angles to the rods 9, 10 together with the structure 11 formed by the rods 9, 10. On the other hand, the direction of the relative movement between the rods 9, 10 and the cover element 2e is parallel to the rods 9, 10, said movement being guided by the sliders 12e, 13e fitted, respectively, on the two longitudinal walls 5e, 6e of the element 2e, and each comprising a pair of wheel-like sliders 18 that rotate about axes of rotation A perpendicular to the plane P. The wheel-like sliders 18 of each pair, fitted along the same longitudinal wall 5e, 6e, are spaced apart and located close to the four corners of the outer perimetric edge of the cover element 2e, in the same way as the sliders 16, 17 related to the structure 11, in order to prevent the element 2e itself from jamming during its movement.

Figure 7:
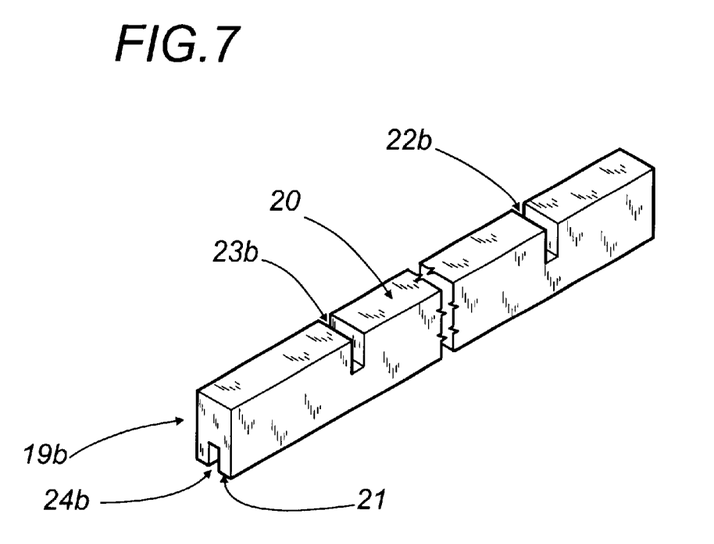
FIG. 7 is a perspective view of a slide-like slider made according to the preferred embodiment illustrated in the above figures, with specific reference to the slider 19b.

As regards the sliders 12b, 13b, 12c, 13c, 12d, 13d of the cover elements 2b, 2c, 2d, it follows from the above description that they move along the rods 9, 10 and along the corresponding rails 14b, 15b, 14c, 15c, 14d, 15d at right angles to the rods 9, 10 themselves. The sliders 12b, 13b, 12c, 13c, 12d, 13d comprise a slide-like slider 19b, 19c, 19d, respectively, which are substantially parallelepipedal in shape, extend lengthways and have a bottom face 20b, 20c, 20d and a top face 21b, 21c, 21d. To be able to perform the aforementioned bidirectional movement, each slide 19b, 19c, 19d has on its bottom face 20b, 20c, 20d two transversal grooves 22b, 23b, 22c, 23c, 22d, 23d parallel to each other and to the rods 9, 10, and on its top face 21b, 21c, 21d a longitudinal groove 24b, 24c, 24d at right angles to the rods 9, 10.

Each of the grooves 22b, 23b, 22c, 23c, 22d, 23d slidably engages with a longitudinal profile of one of the rods 9, 10 to run along the rods 9, 10 together with the mobile cover element 2b, 2c, 2d with which the slide 19b, 19c, 19d itself is engaged, while each of the grooves 24b, 24c, 24d slidably engages with the corresponding rail 14b, 15b, 14c, 15c, 14d, 15d to guide the sliding motion of the cover elements 2b, 2c, 2d in the direction at right angles to the rods 9, 10.

The slides 19b, 19c, 19d are made from material with a very low friction coefficient since they are in continuous sliding contact not only with the rails 14b, 15b, 14c, 15c, 14d, 15d but also with the rods 9, 10 during operation of the cover 1.

To drive the intermediate cover elements 2b, 2c, 2d in a direction parallel to the rods 9, 10, the slides 19b, 19c, 19d of each of the mobile elements engages the sliders of the adjacent cover elements. Further, in the embodiment illustrated in the drawings, there are brackets 25 which support the wheel-like sliders 17 of the fixed cover element 2a and which provide means for contacting the slides 19b of the cover element 2b, thus constituting means for stopping the movement in the direction parallel to the support and guide rods 9, 10.

To drive the cover elements 2b, 2c, 2d in a direction at right angles to the rods 9, 10, the perpendicular longitudinal walls 5b, 6b, 5c, 6c, 5d, 6d of the elements 2b, 2c, 2d engage the perpendicular longitudinal walls 5b, 6b, 5c, 6c, 5d, 6d of the adjacent cover elements.

The mobile end element 2e that is connected to the working part 102 of the machine 100, bidirectionally drives the other cover elements by engaging its longitudinal walls 5e, 6e and transversal walls 7e, 8e respectively with the longitudinal walls 5d, 6d and with the slide 19b of cover element 2d adjacent to it.

Means are also envisaged for dampening the contact between the perpendicular walls 5a, 6a, 5b, 6b, 5c, 6c, 5d, 6d, 5e, 6e, 7a, 8a, 7b, 8b, 7c, 8c, 7d, 8d, 7e, 8e of the cover elements.

Said dampening means dampen the contact resulting from movements parallel to the rods 9, 10 and the contact resulting from movements at right angles to the rods 9, 10.

These dampening means consist of a plurality of elastomeric dampers 26 located along the perpendicular walls 5b, 6b, 5c, 6c, 5d, 6d, 5e, 6e, 7b, 8b, 7c, 8c, 7d, 8d, 7e, 8e of the mobile cover elements 2b, 2c, 2d, 2e.

Figure 6:
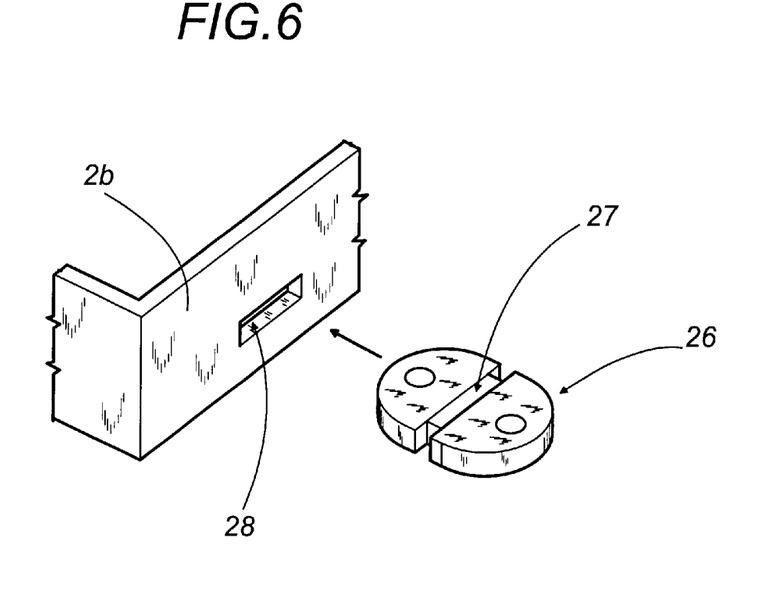
FIG. 6 is a schematic perspective view of a stage of assembling a part of the cover illustrated in the above figures, with specific reference to the element 2b.

As shown in FIG. 6, each of the elastomeric elements 26 consists of a substantially circular body with a narrowed portion 27 designed to engage with a matching slot 28 made in the perpendicular walls 5b, 6b, 5c, 6c, 5d, 6d, 5e, 6e, 7b, 8b, 7c, 8c, 7d, 8d, 7e, 8e. The elements 26 are inserted into the corresponding slots 28 by pressure.

The invention described can be subject to modifications and variations without thereby departing from the scope of the inventive concept. Moreover, all the details of the invention may be substituted by technically equivalent elements.

What is claimed is:

1. A protective cover for a machine with moving parts, where the machine has a frame and a working part which can move, relative to the frame, along an operating path; the protective cover consisting of a plurality of cover elements, including at least one fixed cover element which can be connected to the machine frame, a mobile cover element connected to the working part of the machine and at least one mobile intermediate cover element located between the fixed cover element and the mobile cover element; the cover elements having respective cover panels which extend substantially in a single plane, parallel to a defined placement plane, and each of which has a central opening in it; the cover elements being arranged in order of decreasing size, being positioned around the working part of the machine and being connected to said working part in such a way as to follow its movements, keeping a machining zone covered; there being means provided for supporting the mobile cover elements connected to the fixed cover element; wherein said support means comprise at least one first rod and one second rod for supporting the mobile elements, the rods being at a given distance from each other; and sliders that slide on the rods between each of the elements and the rods themselves to guide the mobile cover elements in a direction parallel to the support rods, wherein each of the sliders moving along the rods and respectively connected with one of the intermediate cover elements is slidably engaged with said element in a direction perpendicular to the rods.

2. The cover according to claim 1, wherein the guide rods are rigidly connected to each other to form a single structure for supporting and guiding the mobile cover elements.

3. The cover according to claim 1, wherein the cover elements have corresponding opposite guide rails which lie at right angles to the support rods so as to guide the cover elements in a direction at right angles to the rods.

4. The cover according to claim 3, comprising mobile sliders located between the rails and the support rods.

5. The cover according to claim 4, wherein the sliders of the mobile cover elements can move along the support rods and along the corresponding rails at right angles to the rods.

6. The cover according to claim 5, wherein the sliders comprise at least one slide designed to move along at least a part of the rods themselves together with the mobile cover element with which the slide itself is engaged.

7. The cover according to claim 6, wherein each cover element has a quadrangular outer perimetric edge with four corners from which there extend, perpendicular to the placement plane, longitudinal walls located on opposite longitudinal sides of the corresponding cover element, and transversal walls located on opposite transversal sides of the corresponding cover element.

8. The cover according to claim 7, wherein the transversal walls of the cover elements comprise the rails that guide the cover elements themselves in the direction at right angles to the rods.

9. The cover according to claim 8, wherein each slide has at least two parallel grooves each of which is designed to slidably engage a longitudinal portion of the profile of the rods in order to guide the sliding motion of the cover elements along the rods themselves.

10. The cover according to claim 9, wherein each slide has at least one groove designed to slidably engage the rails in order to guide the sliding motion of the cover elements in the direction at right angles to the rods.

11. The cover according to claim 10, wherein each slide has at least two parallel grooves each of which is designed to slidably engage a longitudinal portion of the rods, and at least one groove designed to slidably engage the rails in order to guide the sliding motion of the cover elements in the direction at right angles to the rods.

12. The cover according to claim 11, wherein the slides are substantially parallelepipedal in shape, extend lengthways and have a first, bottom face and a second, top face.

13. The cover according to claim 12, wherein the parallel grooves are made in the first, lower faces while each groove is made in the second, top face of each substantially parallelepipedal slide.

14. The cover according to claim 13, wherein the slides are made from material with a very low friction coefficient.

15. The cover according to claim 14, wherein the cover element that is connected to the working part of the machine moves in a direction perpendicular to the rods and together with the rods themselves.

16. The cover according to claim 15, wherein the sliders of the cover element that is connected to the working part of the machine are designed to enable the relative sliding-between the cover element and the rods in a direction parallel to the rods themselves.

17. The cover according to claim 16, wherein the sliders of the cover element that is connected to the working part of the machine comprise a plurality of wheel-like sliders located between the cover element and the support and guide rods, said wheel-like sliders being fitted along the longitudinal walls of the cover element and rotating about an axis that is substantially perpendicular to the cover placement plane.

18. The cover according to claim 17, comprising at least one wheel-like cursor at each of the four corners of the cover element that is connected to the working part of the machine.

19. The cover according to claim 18, wherein drive in the direction parallel to the support rods is accomplished by the engagement of the sliders of the mobile intermediate cover elements with the sliders of the adjacent mobile cover elements.

20. The cover according to claim 19, wherein drive of the mobile intermediate cover elements in the direction at right angles to the rods is accomplished by the engagement of the perpendicular longitudinal walls of the cover elements with the perpendicular longitudinal walls of the adjacent cover elements.

21. The cover according to claim 20, comprising means for dampening the contact between the cover elements while they are being driven.

22. The cover according to claim 21, wherein the dampening means dampen the contact resulting from movements of the cover elements in directions both parallel to the rods and at right angles to the rods.

23. The cover according to claim 22, wherein the dampening means act between the perpendicular walls of adjacent cover elements.

24. The cover according to claim 23, wherein th e dampening means consist of dampers made of elastomeric material.

25. The cover according to claim 24, wherein each of the dampers consists of a substantially circular body with a narrowed portion designed to engage with a matching slot made in the perpendicular walls.

26. The cover according to claim 25, wherein the supporting and guide structure has an outer perimetric edge that is substantially rectangular in shape, having two longitudinal sides formed by the rods themselves, and two transversal sides.

27. The cover according to claim 26, wherein the supporting and guide structure has at least two pairs of wheel-like sliders, the sliders forming each pair being mounted at a certain distance from each other along one of the transversal sides of the structure itself and engaging with the rails forming part of the fixed cover element.

28. A protective cover for a machine with moving parts, said cover comprising:

a plurality of cover elements, including at least one fixed cover element adapted to be connected to an associated machine frame, a mobile cover element adapted to be connected to an associated machine working part, and at least one mobile intermediate cover element located between the fixed cover element and the mobile cover element; said cover elements comprising respective cover panels defining an opening, said cover elements being arranged in order of decreasing size and adapted to cover an associated machine zone; said cover further comprising means for supporting the mobile cover elements, said means for supporting comprising at least one first rod and at least one second rod for supporting the mobile cover elements, said at least one first and said at least one second rod located at a given distance from each other; said cover further comprising sliders that slide on the rods between each of the elements and the rods to guide the mobile cover elements in a direction parallel to the rods, wherein each of the sliders connected to one of said intermediate cover elements is slidably engaged with said intermediate cover element to which it is connected in a direction perpendicular to the rods.

* * * * *